US000001945H

(19) United States

(12) Statutory Invention Registration (10) Reg. No.: US H1945 H

Schwartz (43) Published: Mar. 6, 2001

(54) SUSTAINING CHAOS BY USING BASIN BOUNDARY SADDLES

(75) Inventor: Ira B. Schwartz, Bethesda, MD (US)

(73) Assignee: The United States of America as represented by the Secretary of the Navy, Washington, DC (US)

(21) Appl. No.: 09/204,341

(22) Filed: Dec. 4, 1998

Related U.S. Application Data

(60) Provisional application No. 60/067,050, filed on Dec. 4, 1997.

(51) Int. Cl.[7] ..... H04L 9/00

(52) U.S. Cl. ..... 380/46; 703/266

(58) Field of Search ..... 380/46; 364/528.1; 700/266

(56) References Cited

U.S. PATENT DOCUMENTS

| | | | |
|---|---|---|---|
| 5,402,334 | | 3/1995 | Pecora et al. . |
| 5,442,510 | * | 8/1995 | Schwartz et al. ..... 364/152 |
| 5,447,520 | | 9/1995 | Spano et al. . |
| 5,486,280 | | 1/1996 | Bullock, IV et al. . |
| 5,522,863 | | 6/1996 | Spano et al. . |
| 5,706,192 | | 1/1998 | Schwartz et al. . |
| 5,729,388 | | 3/1998 | Gershenfeld . |

OTHER PUBLICATIONS

Ira B. Schwartz and Ioana Triandaf, "Sustaining Chaos by Using Basin Boundary Saddles," Physical Review Letters, vol. 77, No. 23, pp 4740–4743, Dec. 2, 1996.*

* cited by examiner

*Primary Examiner*—Daniel T. Pihulic

(74) *Attorney, Agent, or Firm*—Barry A. Edelberg; Edward F. Miles

(57) ABSTRACT

A method and apparatus for sustaining chaos in a system by using the natural dynamics of the system to redirect flow towards a chaotic region along unstable manifolds of basin boundary saddles by utilizing small, infrequent parameter perturbations. The perturbations are determined based on the location of an unstable state, which is used as a control reference. The location of the unstable state, which is unobservable, is estimated by calculating a theoretical branch connecting the current state of the system to the target unstable state.

18 Claims, 6 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SUSTAINING CHAOS BY USING BASIN BOUNDARY SADDLES

This application has the priority of provisional application Ser. No. 60/067,050 filed Dec. 4, 1997.

FIELD OF THE INVENTION

In general, the present invention relates to a method and apparatus for sustaining chaos in a system. In particular, the present invention relates to a method and apparatus for preserving chaos in non-chaotic parameter regions by using the natural dynamics of the subject system to redirect flow towards the chaotic region along unstable manifolds of basin boundary saddles, by utilizing small, infrequent parameter perturbations.

BACKGROUND OF THE INVENTION

In many nonlinear systems, such as chaotic vibrations in structures or lasers, there exist regions in which much of the energy is present within a small range of frequencies. Typically, this occurs when the system is operating at or near resonance. Systems, such as aluminum wings or combustion engines, which operate at resonance, may fail due to repetitive stress caused by driving such a system near resonance.

Although numerous areas in science are now known to exhibit chaos as a natural occurrence, many situations would benefit from the inducement of chaos. In biology, the disappearance of chaos may signal pathological phenomena. In mechanics, chaos could be induced in order to prevent resonance, such as with the aluminum wings or combustion engines noted above. For example, in a system of coupled pendulums, one can excite chaotic motion of several modes to spread the energy over a wide frequency range. In optics, material damage is caused by lasers having a peak intensity at a given temporal frequency, so chaos is desirable since it has broadband spectra. It has also been suggested that chaos occur for normal machine tool cutting, making chaos preservation a desired control for deeper than normal cutting.

A conventional method maintains chaos in a regime where only chaotic transients exist, based on accurate analytical knowledge of the dynamical system, and requiring not only a priori phase space knowledge of escape regions from chaos, but also of preiterates of these regions. Such conventional methods maintain chaos using time series which require monitoring and adjusting the system prior to entering an escape region of the attractor by several iterates, an overly burdensome process.

Moreover, for the flow considered herein, preimages of sets in the escape regions cover much of the chaotic transient region, so monitoring all preimages, as done conventionally, would be tedious.

SUMMARY OF THE INVENTION

It is therefore an object of the present invention to provide a method and apparatus for controlling and optimizing the sustain of chaotic transients merely by examining behavior near a saddle.

According to a preferred embodiment of the present invention, such a method for sustaining chaos includes monitoring output parameters of a system, defining a saddle region containing a basin saddle for the system, and redirecting the output parameters toward a chaotic region when the output parameters enter the saddle region, by applying changes to input parameters of the system based on information describing the chaotic region.

According to another aspect of the present invention, a method for maintaining a stable state of a system includes monitoring an adjustable parameter of a system, obtaining information describing an unstable state of the system, and applying parameter perturbations to the system based on the obtained information describing the unstable state. The information describing the unstable state of the system may be the location of the unstable state. Obtaining the information describing the unstable state of the system may include finding a branch connecting a current, stable state of the system to the unstable state, and estimating the location of the unstable state based on the connecting branch. Applying parameter perturbations to the system based on the obtained information describing the unstable state may include implementing a target procedure to direct the system from the stable state toward the unstable state. Implementing a targeting procedure may include varying the adjustable parameter. The method may further include using the location of the unstable state as a reference for control of the system by the application of parameter perturbations. The method may also include determining the parameter perturbations based on the location of the unstable state. Preferably, the stable state is observed, and the unstable state is unobservable.

According to a further aspect of the invention, an apparatus for sustaining chaos includes means for monitoring output parameters of a system, means for defining a saddle region containing a basin saddle for the system, and means for redirecting the output parameters toward a chaotic region when the output parameters enter the saddle region. The latter means includes means for applying changes to input parameters of the system based on received information describing the chaotic region.

According to yet another aspect of the invention, an apparatus for maintaining a stable state of a system includes means for monitoring an adjustable parameter of a system, means for obtaining information describing an unstable state of the system, and means for applying perturbations to the adjustable parameter based on the obtained information describing the unstable state. The information describing the unstable state of the system may be the location of the unstable state. The means for obtaining the information describing the unstable state of the system may include means for finding a branch connecting a current, stable state of the system to the unstable state, and means for estimating the location of the unstable state based on the connecting branch. The means for applying perturbations to the adjustable parameter based on the obtained information describing the unstable state may include means for implementing a target procedure to direct the system from the stable state toward the unstable state. The apparatus may also include means for using the location of the unstable state as a reference for control of the system by the application of parameter perturbations. The apparatus may further include means for determining the parameter perturbations based on the location of the unstable state. The means for implementing a targeting procedure may include means for varying the adjustable parameter. Preferably, the stable state is observed, and the unstable state is unobservable.

These and other features and advantages of the invention will be better understood upon consideration of the following detailed description of the preferred embodiments, as illustrated by the accompanying drawings.

BRIEF DESCRIPTION OF THE DRAWINGS

FIG. 1(*b*) shows time series for log (u) at δ=1.88 illustrating a chaotic transient landing on a period-four attractor (every other iterate is shown).

DETAILED DESCRIPTION OF THE INVENTION

Figure 1A:
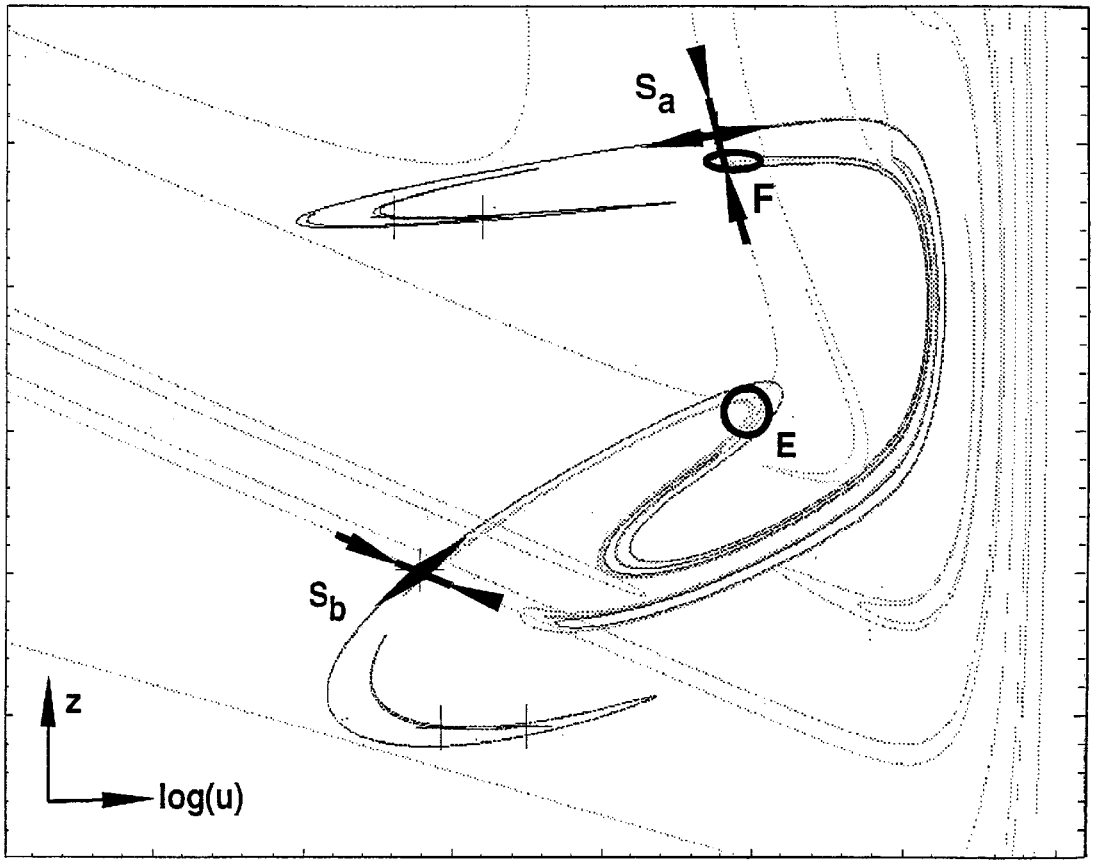
FIG. 1(*a*) shows stable and unstable manifolds associated with basin boundary period-two saddle ($S_a$, $S_b$) at $\delta$=1.88.

This invention provides a framework in which control may be used to spread the energy to a broadband by using small, infrequent perturbations to change the system to one in which chaos prevails. The technique may be applied to any system which was chaotic over a range of values, but is now resonant at a single frequency or over a few frequencies.

The technique of the present invention makes use of quantities which are measurable experimentally and thus can be applied to real data taken directly by time series. In particular, the present invention sustains chaos by using the dynamics of a governing saddle.

The situation addressed by the present invention occurs when there are chaotic transients in the presence of another non-chaotic attractor. The method of the invention maintains chaos by using the natural dynamics of unstable states lying on the basin boundary separating a periodic attractor from chaotic transients, which are referred to herein as basin saddles. Technically, there is only one attractor since chaos is a transient. However, there is still a stable manifold which separates the chaotic transient from the periodic attractor. According to the present invention, once system flow gets in a neighborhood of a basin saddle, small perturbations of an accessible system parameter may be used to redirect the flow towards the chaotic transient region. This may be done by a targeting technique which uses the linearization of the flow about the saddle. A probability distribution of escape times may be used to optimize chaos preservation by targeting regions having long chaotic transients, thus minimizing the number of parameter fluctuations.

In the context of the present invention, "escape region" means a region such that if an iterate falls within it, the subsequent iterates are rapidly drawn to an attractor. The same region is also commonly called a "loss region" in relevant technical fields. Instead of preventing escape to an attractor in advance, the approach of the present invention is to let the system enter a region containing a basin saddle and then redirect the flow back into the chaotic region, by using a targeting technique which uses the natural dynamics around the saddle. This makes the parameter changes very infrequent and, in fact minimal.

A basic advantage of the present invention is that it uses a saddle that is generic to many types of nonlinear systems to sustain chaotic behavior, even though the chaotic behavior itself is unstable. Another advantage is that a targeting algorithm can be made to target points which have very long chaotic transients, thus minimizing interventions by using adjustable parameters. Furthermore, by using a saddle as a reference point, frequency broadening may take place in the presence of parametric drift due to noise.

There are two basic premises that make the inventive method especially simple. First, the system has a saddle having a one-dimensional unstable manifold, which crosses a stable manifold of arbitrary dimension, causing a boundary crisis to occur, which results in resonant periodic behavior as the only type of behavior. Secondly, the system has an accessible parameter to control the dynamics near the saddle. Thus, according to the present invention, the saddle may be used to control and optimize the sustain of chaotic transients.

Figure 1B:
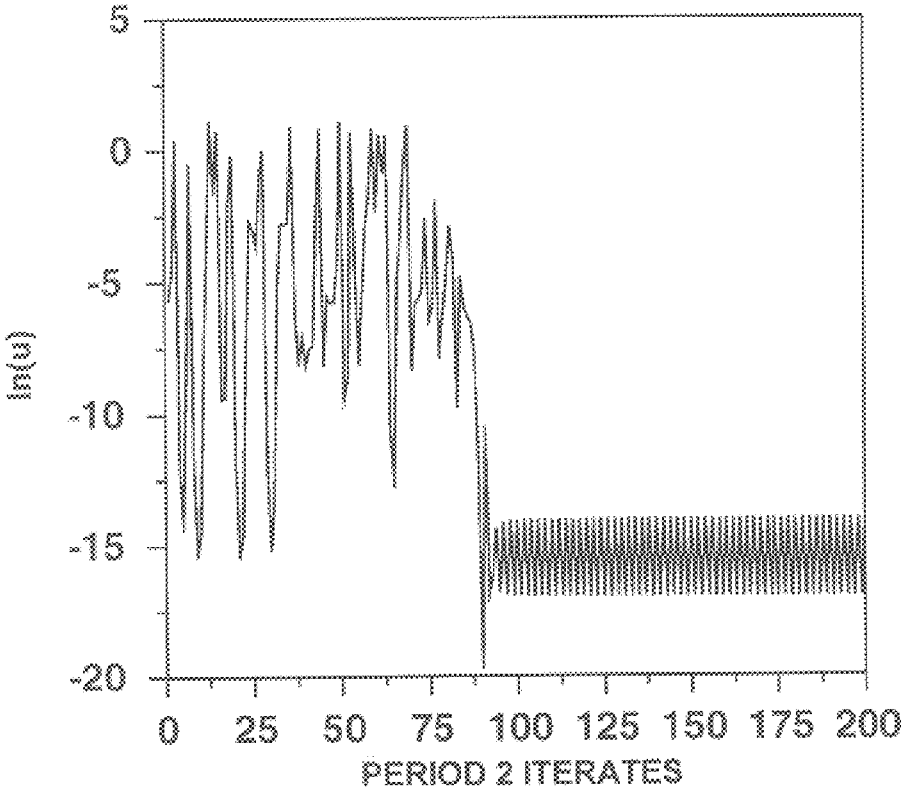

The present invention is applicable to all systems in which it is advantageous to maintain chaos. Generally, consider the following n-dimensional system $$\frac{dy}{dt} = F(y, t, \delta)$$

where y is an n-dimensional vector, F is an n-dimensional vector field, δ is an adjustable parameter, and t is a scalar representing time. The targeting method for sustaining chaos can be applied to the general system described above, but it is most easily exemplified as applied to a two-dimensional system modeling a driven $CO_2$ laser, where $$\frac{du}{dt} = -u[\delta\cos(\Omega t + \phi) - z], \qquad (1)$$

$$\frac{dz}{dt} = -\varepsilon_1 z - u - \varepsilon_2 zu + 1,$$

where Ω denotes the angular frequency of the laser output and φ its phase, and u and z denote (scaled) intensity and population inversion, respectively. The control parameter δ represents the amplitude of the drive, and $\epsilon_1$, $\epsilon_2$, and φ are fixed. At $\delta=\delta_c=1.84$, a crisis occurs between a period-two saddle and a chaotic attractor. Just before δ reaches $\delta_c$, there exist two attractors, one periodic and one chaotic. The stable manifold of a period-two saddle lying on the basin boundary splits the local phase space about the saddle in the following manner: orbits having initial conditions lying to the right of and near one saddle converge to the chaotic attractor. Orbits starting to the left converge to the period-two attractor. For δ slightly past $\delta_c$, a horseshoe is created from the right; that is, the unstable manifold to the right of the stable manifold crosses the stable manifold (see FIG. 1(*a*) near $S_a$). Almost all points in the region near the saddle now converge to a period-four orbit which has period-doubled off the period-two branch. FIG. 1(*a*) shows the manifold of phase space of the defining period-two basin saddle, labeled by $S_a$ and $S_b$. The crosses represent the period-four attractor. The chaotic transients lie near the unstable manifold. FIG. 1(*b*) shows a chaotic transient settling into a period-four attractor after the iterate enters the escape region to the left of the upper saddle (every other iterate is shown).

For the inventive method of maintaining and optimizing the length of chaotic transients, the regions near the basin saddles which contain points of long chaotic transients are first identified. The flow is redirected towards these regions once it crosses the basin boundary of the attractor.

Figure 2:
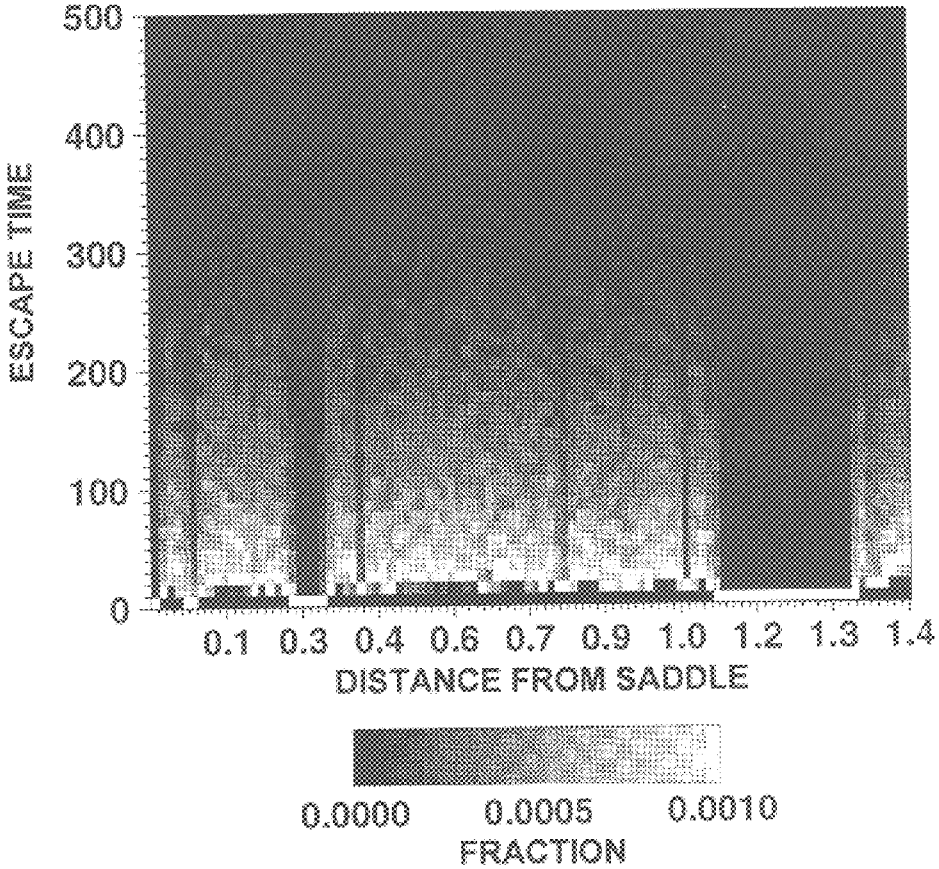
FIG. 2 shows a probability distribution of escape times as a function of distance from the saddle $S_a$ for points inside the chaotic region to the right of $S_a$ near the unstable manifold.

In FIG. 2, a distribution of escape times for trajectories starting near $S_a$, close to and to the right of the unstable manifold of $S_a$ (that is, the side with chaotic transients) is shown. These points lie on a line segment, $L_a$ near $S_a$ as shown in FIG. 1. The horizontal axis represents equally spaced intervals on $L_a$. For the points in such an interval, the fraction of points having escape times in time intervals represented on the vertical axis are calculated. In other words, given a time interval on the vertical axis and a space interval on the horizontal axis, the intensity of the grey scale of the distribution indicates the fraction of points in that space interval having escape times in the chosen time interval. This data shows that there is a wide distribution of points near the saddle which escape very quickly to the attractor, as well as points with very long escape times. The fraction of points having a given mean escape time has an exponential distribution. Moreover, since preimages of points in the escape regions essentially cover the chaotic transient region, applying perturbations to prevent the flow from entering the escape regions, which would seem to be a logical approach to sustaining chaos, may actually kick the dynamics into faster escaping regions. Thus, the approach of the present invention, that is, to allow the system to enter the basin saddle region and redirect system flow back into the chaotic region, is more advantageous, although it may appear counterintuitive.

The relations set forth at (1) above may be written in generic form as: $\phi'=F(t,\phi)$. A poincare map of this flow is obtained by sampling the system with the frequency of the drive, giving:

$$x_{n+1}=T(x_n,\delta)=\phi(1,0,x_n,\delta) \tag{2}$$

where $\delta$ is the parameter adjusted to maintain chaos. The Jacobian of the map T, calculated at the unstable orbit is given by:

$$A=\frac{\partial\phi}{\partial x_a}(1,0,x_n,\delta)|x_a=s_a.$$

An algorithm used according to the invention perturbs $\delta$ once an iterate of $T^2$ enters a neighborhood of the period-two basin boundary basin saddle $(S_a, S_b)$, where $S_a=T^2(S_a)$, and $S_b=T(S_a)$ $T^2$ is linearized about both $S_a$ and $S_b$. Based on the linearization, a formula may be derived for the parameter perturbation that can be used to regenerate chaos. The same procedure must be applied for both $S_a$ and $S_b$ (which contain escape regions), even when the map considered is $T^2$.

In order to make practical use of basin saddle information, the region of interest is restricted to a local region, $D_{loc}$, of phase-space near a saddle, for example $S_a$ shown in FIG. 1. The region to the left of $S_a$ contained in $D_{loc}$ is called the basin escape region. A similar description holds for a local region near $S_b$.

The stable manifold of the period-two saddles separates the region with transient chaos from the period-four attractor. Iterates are sent back to the opposite side of the stable manifold once they enter the basin escape region, preferably close to the unstable manifold of the saddle where the natural dynamics will send the iterates further into the chaotic region. By restricting the action of the dynamic to $D_{loc}$, the perturbations acting on a linearized system may be examined.

To derive the formula for the parameter perturbation let $\xi_n=x_n-S_a$ and consider the map $\xi_{n+1}=P(\xi_n,\delta)=T^2(x_n,\delta)-S_a(\delta)$, which has fixed point $\xi_F=0$. This map is linearized about its fixed point to obtain:

$$\xi_{n+1}\cong\delta_n g+[\lambda_u e_u f_u+\lambda_a e_a f_a]\cdot(\xi_n-\delta_n g) \tag{3}$$

where A has been expressed in terms of left and right eigenvectors, and $$g\equiv\frac{\partial s(\delta)}{\partial\delta_{\delta=\delta_0}}\cong\frac{1}{\bar{\delta}-\delta_0}\xi_F(\bar{\delta}),$$

for some $\bar{\delta}$ close to the operational parameter $\delta_0$.

A desired region is targeted near the saddle on the side with chaos, based on the distribution shown in FIG. 2, where it is known that there is a high probability of obtaining long chaotic transients. According to the premise by which (3) was derived, it is required that $\xi_{tar}=x_{tar}-S_a$, where $x_{tar}\epsilon L_a\cap D_{loc}$ is chosen as a target point. The value $x_{tar}$ is chosen such that it is contained in a region where long chaotic transients emerge before the flow escapes again. Equation (3) becomes:

$$\xi_{tar}=x_{tar}-x_F\cong[\lambda_u e_u f_u+\lambda_s e_s f_s]\cdot(\xi_n-\delta_n g) \tag{4}$$

Multiplying through in (4) by $f_s$:

$$\delta_n\equiv\frac{(\lambda_s\xi_n-\xi_{ar})\cdot f_s}{(\lambda_s-1)g\cdot f_s}\equiv C_1\cdot(\lambda_s\xi_n-\xi_{ar}). \tag{5}$$

Applying small changes in parameters given by (5) may lead to large changes in preimages of escape regions, but the saddle location varies only slightly.

Figure 3:
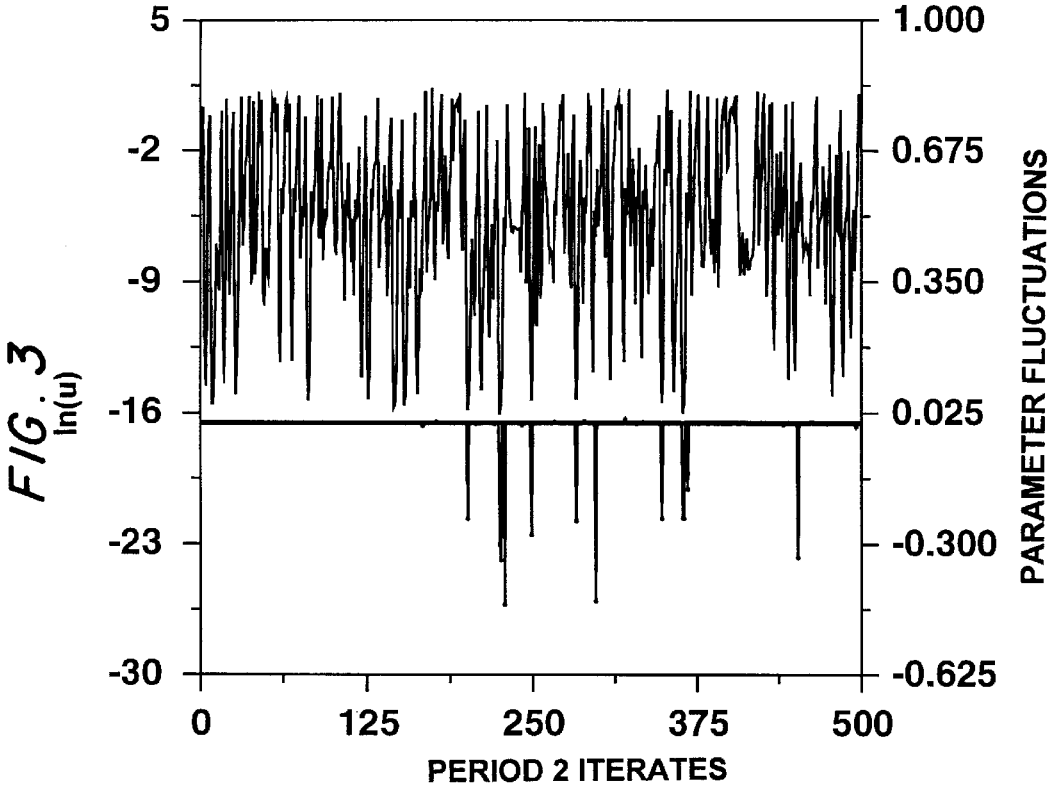
FIG. 3 shows a sustained chaotic time series for log (u) and parameter fluctuations used to sustain chaos.

As an experimental example, the sustained chaotic time series for log (u) is shown in FIG. 3 along with the corresponding parameter perturbations. In this case, only five perturbations to $\delta$ were performed to maintain 500 iterates of $T^2$, that is, chaos was sustained for 1000 iterates of T. The noise level was 1% and the parameter perturbations occuring in this case were below 0.6. Certain regions were targeted near the unstable manifold which generate long chaotic transients. This is efficient since four of the five perturbations necessary to maintain chaos were larger than the mean chaotic transient time, which was found to be approximately 27 iterates.

One of the main assumptions made using the method of the invention is that just before entering the basin escape region, the iterates must pass near either saddle $S_a$ or $S_b$. However, iterates contained in a region not local to the saddles, but nevertheless in an escape region, can be directed toward $D_{loc}$, which contains a basin saddle. A region (region E as shown in FIG. 1(*a*)) is chosen inside the chaotic transients and which lies in the basin of the period-four attracting orbit.

Figure 4:
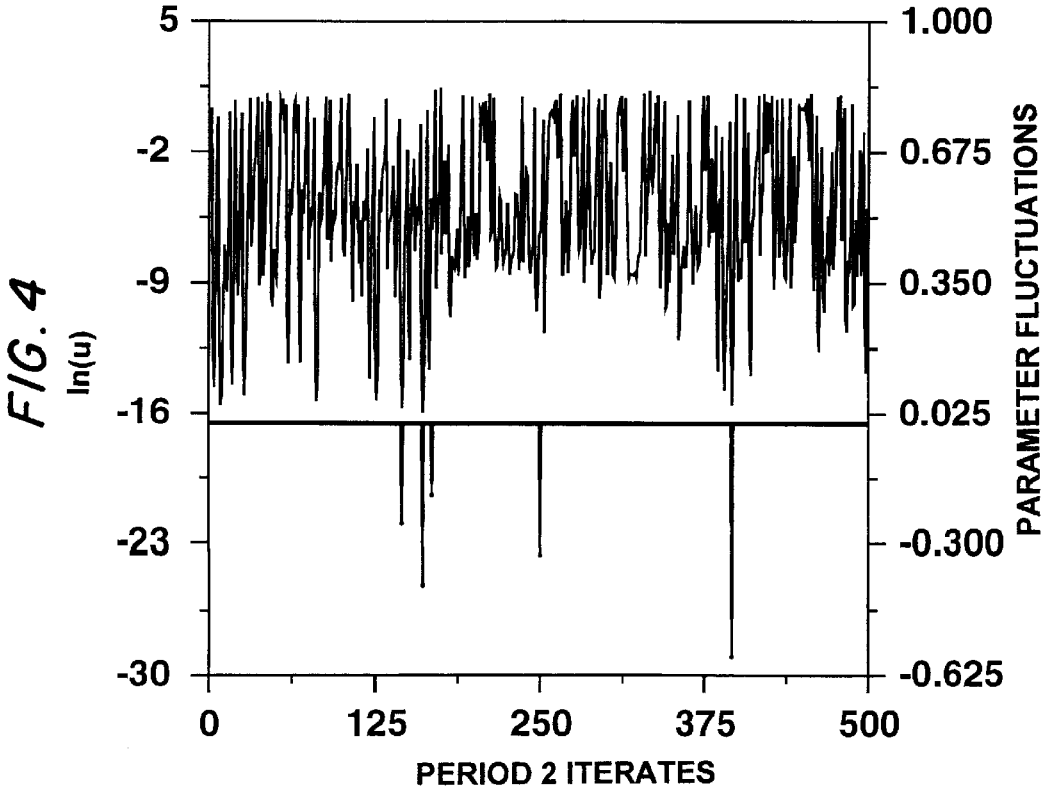
FIG. 4 shows a time series for log (u) and corresponding parameter fluctuations used to sustain chaos based on monitoring region E in FIG. 1*a*.

The idea is to redirect the iterates from such a region by targeting a certain region or point inside the chaotic regime by using, for example, the algorithm introduced above. For example, it has been found that the region near the upper saddle to the right (region F as shown in FIG. 1(*a*)) is accessible from region E, in only one iterate by small amplitude perturbations of the parameter. The reason is that the image under the flow of a point in E lies inside F. If this were not the case, several intermediate points would have to be targeted before reaching region F. The phase-space sustained chaotic time series is shown in FIG. 4. The changes in the parameter used for targeting from region E to region F are one order of magnitude smaller than the other parameter changes and are not seen clearly in FIG. 4. Several other escape regions such as region E are mapped by the flow into one of the regions near the period-two saddle, so it is enough to apply parameter perturbations near the saddle.

Figure 5:
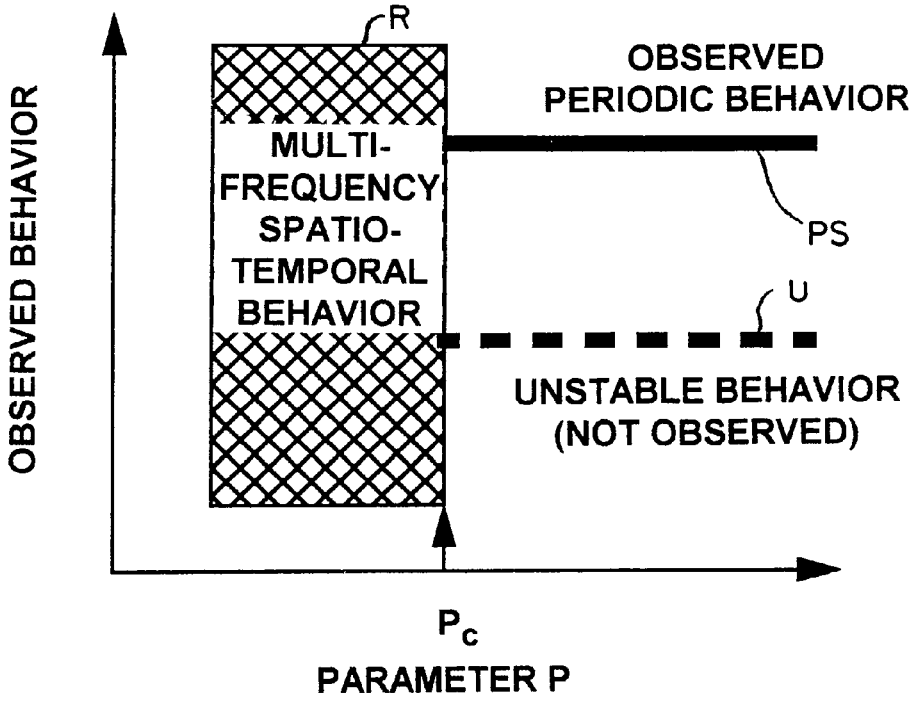
FIG. 5 shows a system having stable and unstable states, and an adjustable parameter P.

Referring to FIG. 5, a further example is shown in which a system has a parameter P which is adjustable, and an observed behavior. In the cross-hatched region R, the observed behavior is very complex, containing many frequencies and/or modes. Examples of such systems include combustion engines and fluid-structure interactions in resonance. After the parameter P passes a critical value of $P_c$, the behavior that is observed is periodic, indicated by the solid line PS. It is in this parameter region that the system is operating, and it is desirable to remain in this region. However, the goal is to get information about the unstable state, indicated by the dashed line U. Information about the unstable state may be used to apply parameter perturbations near the saddle. Thus, in addition to the behavior observed in FIG. 5, an unstable object exists, which is not observable because it is unstable. The unstable state U is located as follows.

Figure 6:
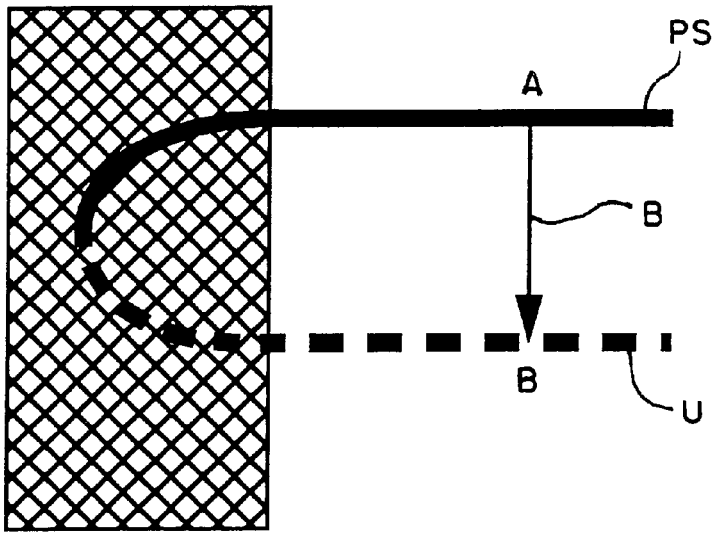
FIG. 6 shows a connection between the stable and unstable states of the system shown in FIG. 5.

FIG. 6 shows that the periodic state PS is connected to the unstable state U. By knowing the form of the connecting branch B, which is dictated by theory, one may estimate the location of the unstable state U to use as a reference for control. One then may implement a targeting procedure by varying the parameter P to get from point A of the observed periodic behavior PS to point B of the unobservable unstable behavior U. Once in the neighborhood of B, control may be implemented to stabilize that point, and discern the necessary local information for application to the system to avoid resonance.

The present invention has been described by way of example and in terms of preferred embodiments. However, it is to be understood that the present invention is not strictly limited to the disclosed embodiments. To the contrary, various modifications, as well as similar arrangements, are included within the spirit and scope of the present invention. The scope of the appended claims, therefore, should be accorded the broadest possible interpretation so as to encompass all such modifications and similar arrangements.

For example, the description may be generalized to include systems having any number of dimensions. Such an n-dimensional system is described with reference to FIG. 7.

Figure 7:
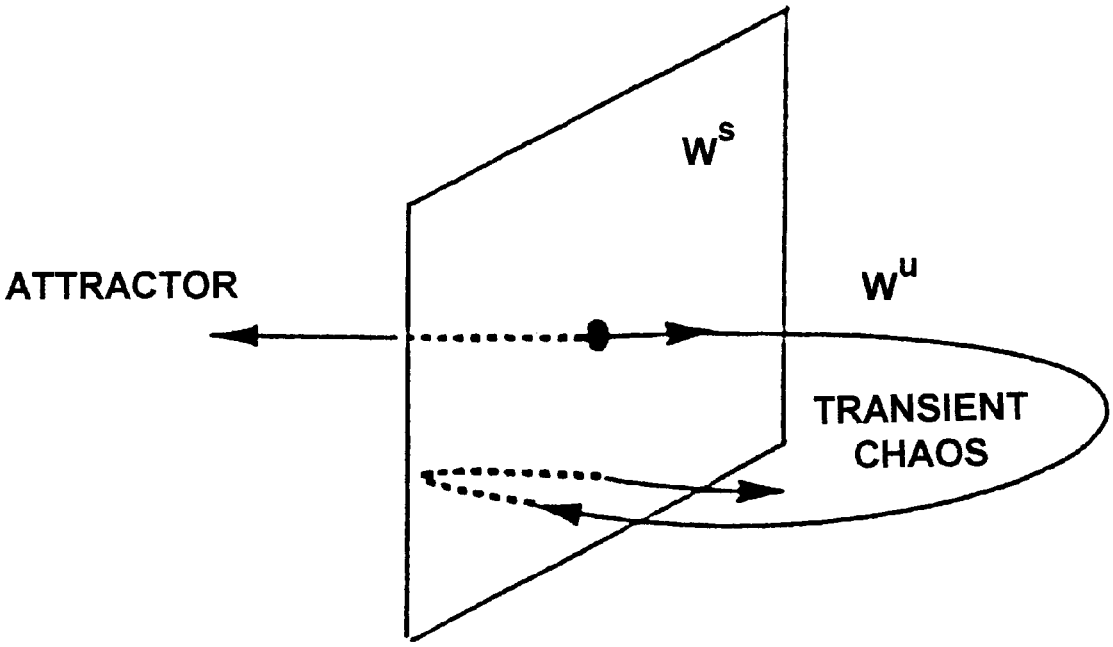
FIG. 7 shows a generalized n-dimensional system to which the method of the present invention may be applied.

Crises typically occur when a saddle point has its unstable ($W^u$) and stable ($W^s$) manifold intersect, as shown in FIG. 7. The success of the control technique used in the system depends on being able to model the control system as a map. Specifically, the delay between the time when the system is monitored to when control is applied must be very small compared to the overall period. If the technique is attempted on fast systems relative to the control loop delay, such as electronics and optics systems, then the delay must be taken into account. Furthermore, the method of this example is restricted to one in which the parameter change is on for a whole drive period, which forces the system to retain the history of the parameter changes to target in higher dimensions. However, allowing the parameter delay as well as its duration to be adjustable allows one to accomodate more than one unstable dimension.

To see this, consider the steady state saddle of the n-dimensional system shown in FIG. 7:

$$\frac{dz}{dt} = F(z, p), \tag{6}$$

where p is a parameter, and (z,p)=(0,0) is the saddle point having unstable and stable dimensions greater than 1. Linearizing about the saddle yields $$\frac{dx}{dt} = A \cdot x + Bp, \tag{7}$$

where A and B are the usual Jacobian approximations using delay embedding. Let $T_d$ and $T_c$ denote the delay of actuation and parameter duration, respectively. For a given vector $x_0$ near the saddle, the map, M, is defined by $$M(x_0, T_d, T_c, p) = e^{AT_c} \cdot (e^{AT_d} \cdot x(0) + A^{-1} \cdot Bp) - A^{-1} \cdot Bp. \tag{8}$$

Parameters are now chosen so that a given point, $x_T$, is targeted to lie in the unstable manifold which generates the chaotic transient. Assuming $A = S \cdot \Lambda \cdot S^{-1}$, where S is composed of right eigenvectors, $e_i$, and $S^{-1}$ of left eigenvectors, $f_i$, i=1 . . . n, Λ diagonal, up to three stable eigendirections, and n−3 unstable directions are allowed. To target $x_T$, $M(x_o, T_c, T_d, p) = S \cdot k$ is solved for $(T_c, T_d, p, k)$, where $k = (0, 0, 0, k_4 \ldots k_n)$. The elements $k_i$ are used to target $x_T$ on the unstable manifold. Since $x_T$ is in the unstable manifold, $$x_T = \sum_{i=4}^{n} \beta_i e_i.$$

Using the fact that $$S = \sum_{i=1}^{n} \lambda_i e_i f_i^t,$$

it is easy to show that $$k = \sum_{j=4}^{n} \frac{\beta_j}{\lambda_j} f_j.$$

Figure 8:
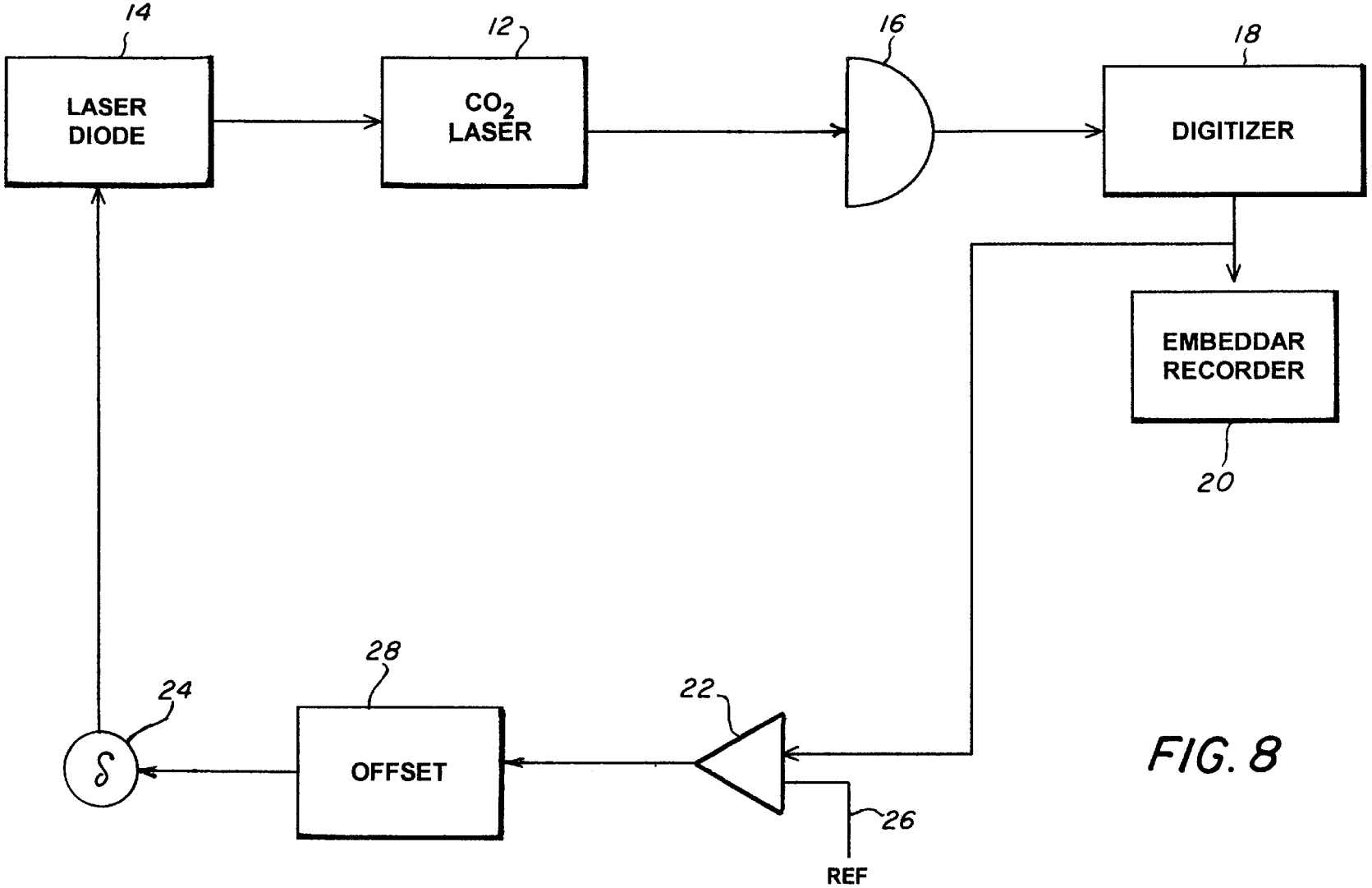
FIG. 8 is a schematic of an embodiment according to the invention.

FIG. 8 shows a setup for practicing the invention, in which the system under control is carbon dioxide laser 12. Laser diode 14 pumps laser 12, and is itself driven by adjustable drive 24. The magnitude of drive 24 corresponds to δ is the above equations. The output of laser 12 is transduced by photodetector 16, and digitized by member 18. The digitized output of laser 12 is fed to embedder/recorder 20 which may embed the output by any conventional technique, or record the data for later processing. Output from digitizer 18 also goes to comparator 22, which determines the difference between the output of laser 12 and a fixed reference 26, this difference controls the magnitude of offset driver 28, which adjusts the magnitude of input 24 of laser diode 14, thereby adjusting the intensity of the pumping of laser 12. Although the schematic of FIG. 8 shows as the system under control a carbon dioxide laser, one skilled in the art will recognize that within the scope of the invention one could as well employ in its place any other potentially chaotic system, so long as the system has in its phase space a periodic attractor separated by a boundary from a region of chaotic transients. As one skilled in the art will also recognize, there are innumerable such systems, a non-exhaustive list of which includes machine the aircraft wings and machine cutting tools mentioned above, metal fatigue, mechanical vibratory systems, and biological systems, most notably brain function.

What is claimed is:

1. A method for sustaining chaos, comprising:

monitoring output parameters of a system;

defining a saddle region containing a basin saddle for the system; and redirecting the output parameters toward a chaotic region when the output parameters enter the saddle region, by applying changes to input parameters of the system based on information describing the chaotic region.

2. A method for maintaining a stable state of a system, comprising:

monitoring an adjustable parameter of a system;

obtaining information describing an unstable state of the system; and applying parameter perturbations to the system based on the obtained information describing the unstable state effective to direct the system away from the unstable state to a stable region.

3. The method of claim 2, wherein the information describing the unstable state of the system is the location of the unstable state.

4. The method of claim 2, wherein obtaining the information describing the unstable state of the system includes:

finding a branch connecting a current, stable state of the system to the unstable state; and estimating the location of the unstable state based on the connecting branch.

5. The method of claim 4, wherein applying parameter perturbations to the system based on the obtained information describing the unstable state includes implementing a target procedure to direct the system from the stable state toward the unstable state.

6. The method of claim 3, further including using the location of the unstable state as a reference for control of the system by the application of parameter perturbations.

7. The method of claim 6, further including determining the parameter perturbations based on the location of the unstable state.

8. The method of claim 5, wherein implementing a targeting procedure includes varying the adjustable parameter.

9. The method of claim 4, wherein the stable state is observed, and the unstable state is unobservable.

10. An apparatus for sustaining chaos, comprising:

means for monitoring output parameters of a system;

means for defining a saddle region containing a basin saddle for the system; and means for redirecting the output parameters toward a chaotic region when the output parameters enter the saddle region, including means for applying changes to input parameters of the system based on received information describing the chaotic region.

11. An apparatus for maintaining a stable state of a system, comprising:

means for monitoring an adjustable parameter of a system;

means for obtaining information describing an unstable state of the system; and means for applying perturbations to the adjustable parameter based on the obtained information describing the unstable state, the means for applying perturbations being effective to direct the system away from the unstable state to a stable region.

12. The apparatus of claim 11, wherein the information describing the unstable state of the system is the location of the unstable state.

13. The apparatus of claim 11, wherein the means for obtaining the information describing the unstable state of the system includes:

means for finding a branch connecting a current, stable state of the system to the unstable state; and means for estimating the location of the unstable state based on the connecting branch.

14. The apparatus of claim 13, wherein the means for applying perturbations to the adjustable parameter based on the obtained information describing the unstable state includes means for implementing a target procedure to direct the system from the stable state toward the unstable state.

15. The apparatus of claim 12, further including means for using the location of the unstable state as a reference for control of the system by the application of parameter perturbations.

16. The apparatus of claim 15, further including means for determining the parameter perturbations based on the location of the unstable state.

17. The apparatus of claim 14, wherein the means for implementing a targeting procedure includes means for varying the adjustable parameter.

18. The apparatus of claim 13, wherein the stable state is observed, and the unstable state is unobservable.

* * * * *